May 12, 1925.  S. A. SØLLING  1,537,151
ILLUMINATING DEVICE FOR RELATIVELY LONG AND NARROW OBJECTS OR SURFACES
Filed Sept. 12, 1924
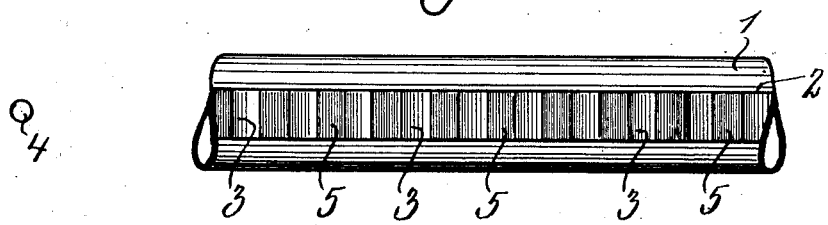
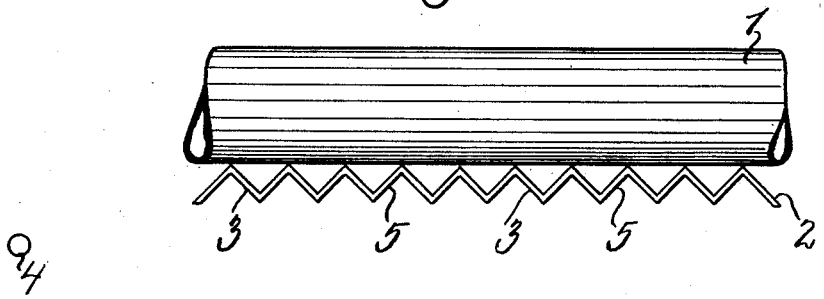
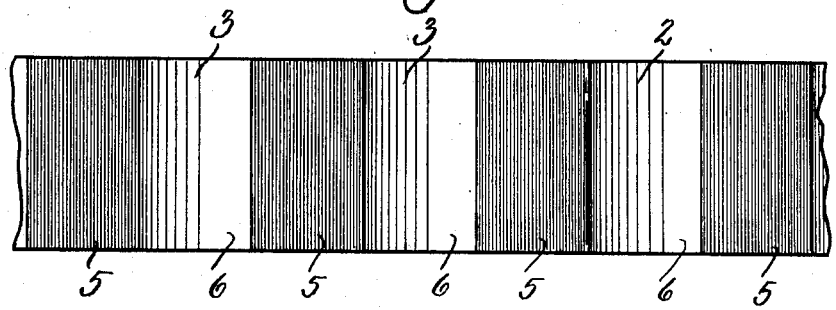
Inventor.
Samuel Anton Sølling
By Attorney.

Patented May 12, 1925.

1,537,151

UNITED STATES PATENT OFFICE.

SAMUEL ANTON SOLLING, OF AARHUS, DENMARK.

ILLUMINATING DEVICE FOR RELATIVELY LONG AND NARROW OBJECTS OR SURFACES.

Application filed September 12, 1924. Serial No. 737,314.

*To all whom it may concern:*

Be it known that I, SAMUEL ANTON SØLLING, railway superintendent, a subject of the King of Denmark, residing at Aarhus, Denmark, have invented certain new and useful Improvements in Illuminating Devices for Relatively Long and Narrow Objects or Surfaces, of which the following is a specification.

The present invention is an arrangement for lighting objects or surfaces of relatively great length and narrow width, in cases when the object is not exactly to let the details of the body or surface appear with full distinctness, but to produce, by means of one or a few light producers, a striking light-effect of considerable extent, for instance for advertising, illuminating or signalling purposes.

More especially, the invention has for its object to provide a warning illumination of railway gates or the like, but it may equally well be used on various signalling apparatus, such as railway semaphores, switch indicators, automobile tail lamps (to replace cat's eyes) and the like, as well as for illuminated signs, direction-posts, or for tracing the outlines of buildings during illumination, etc. In the following, the invention will be assumed to be used for illumination of ordinary railway gates pivoted about a horizontal axis, which gates, as is well known, have not heretofore been really well lighted, but during darkness have merely supported a lantern, the gate proper being left in darkness.

The invention consists in providing the object or surface concerned with a series of inclined facets transversely disposed relatively to the longitudinal axis of the gate and adapted to reflect light, mainly in one and the same direction, from a light source placed at one end of the object or from light sources at both ends. The said facets will then, when viewed at a distance, appear as short luminous lines of a certain width and a certain brightness decreasing in direction away from the light source and with intervening dark fields and extending longitudinally of the object or surface.

A railway gate will thus in very striking manner appear cross-hatched with lines of light, whether the gate be raised into vertical position or lowered into horizontal barring position.

In corresponding manner, a semaphore wing for instance, may be caused to show, besides the ordinary red or green light point, a series of white or coloured cross-lines throughout its entire length.

On the drawing is shown one construction of the invention adapted for illumination of a railway gate, and Fig. 1 represents a portion of such gate in lowered position, looking towards the track, and fitted with the illuminating device, Fig. 2 is a corresponding top view, and Fig. 3 shows, diagrammatically, a picture of the illuminating effect attained.

Along the side of the gate 1 there is attached a longitudinal zigzag-shaped strip 2 of suitable light-reflecting material. It is shaped in such a manner that its forms oblique facets 3 facing the source of light, for instance an ordinary signal lantern, the position of which is indicated by the numeral 4, and the said oblique facets are disposed transversely to the longitudinal axis of the gate. The shape of the intervening facets 5, which do not face the source of light, is immaterial. They may be obliquely disposed as shown on the drawing, or they may be perpendicular to the longitudinal direction of the gate, or they may be of any other shape, or may be omitted entirely, as they do not all participate the production of the light effect.

The latter is shown diagrammatically in Fig. 3, which reproduces a portion of Fig. 1, on a larger scale, with the facets 3 and 5. Assuming the source of light to be located to the left, the illuminating effect produced will consist of light rays 6 projected horizontally, or nearly horizontally, and in a direction at right angles, or nearly at right angles, to the longitudinal direction of the gate. The width of these strips of light will be reduced in direction away from the source of light, because a larger and larger portion of the oblique facets will be shaded by the facet in front. Besides, the intensity of the light strips will decrease in the same direction.

If it be desired that all the illuminated facets should reflect the light in exactly the same direction, they must be given a correspondingly varying inclination, in such a manner that they incline more towards the gate, the more they are removed from the source of light.

In the construction shown, the oblique facets are supposed to be produced by means of an iron strip bent in zigzag-shape and painted with a light-reflecting paint, for instance the well known rust-preventing aluminium paint which gives a very intense illuminating effect during darkness.

The light-reflecting surface may, however, be produced from any suitable material.

Even in sunshine or diffused day-light, as well as in darkness in the vicinity of a casual source of light, the described light-effect may be attained by means of the device here specified, provided only that the inclined facets are placed in such a manner that they reflect in the desired direction the light received. Even for intermittent light-effect the device is well suited, and this effect may be attained either by letting the source of light be intermittent, or by letting it supply continuous light, while the inclined facets are moving.

Having now particularly described and ascertained the nature of my said invention and in what manner the same is to be performed, I declare that what I claim is:—

A railway gate or similar traffic-preventing device in the form of a horizontally-pivoted arm of comparatively great length to extend across a roadway, provided with a strip of thin metal which is secured to and extends continuously along its length and is bent into zig-zag shape to form a continuous series of oblique facets, the individual facets being disposed transversely of the strip and substantially vertical to the roadway and having light-reflecting faces adapted to be illuminated by light projected against them from a light-source placed at an end of the strip.

In testimony whereof I affix my signature.

SAMUEL ANTON SØLLING.